No. 898,130. PATENTED SEPT. 8, 1908.
J. D. O'BRIEN.
THILL DETACHER.
APPLICATION FILED AUG. 17, 1907.
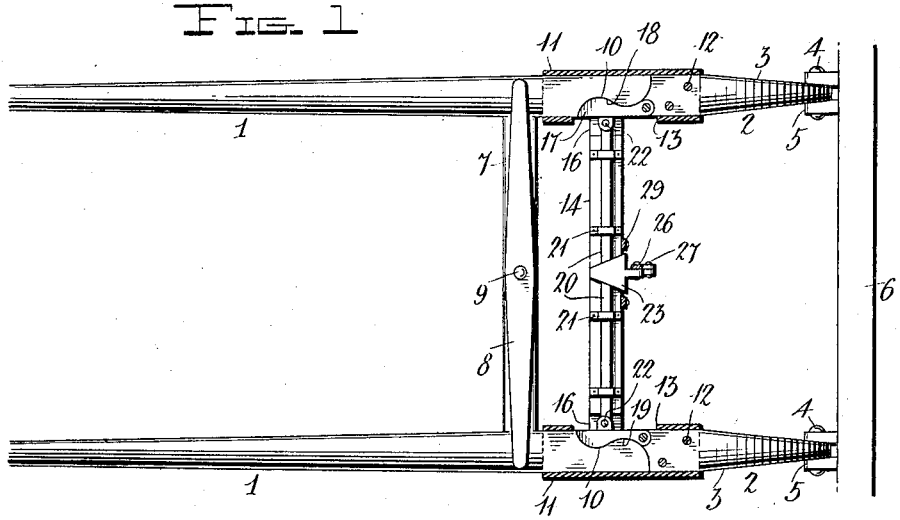
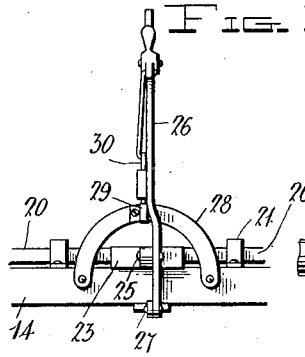
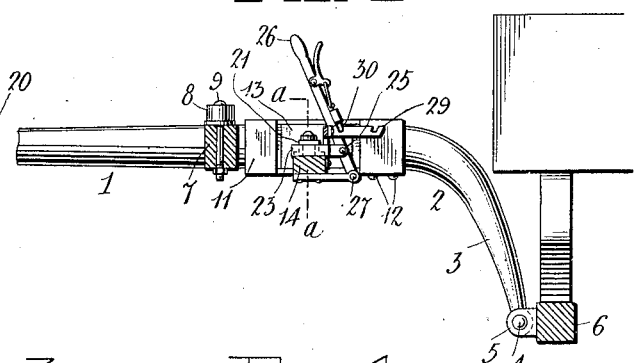
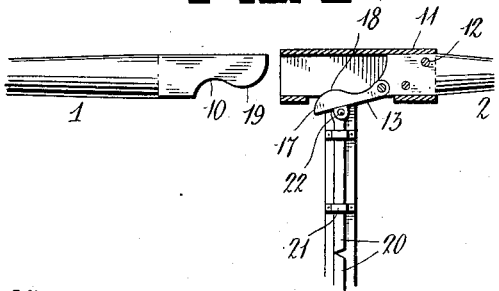
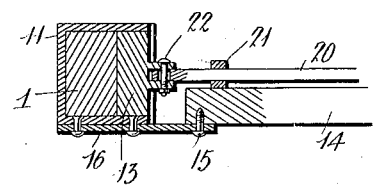
Witnesses
Inventor
James D. O'Brien
By Victor J. Evans
Attorney

UNITED STATES PATENT OFFICE.

JAMES D. O'BRIEN, OF PHŒNIXVILLE, PENNSYLVANIA.

THILL-DETACHER.

No. 898,130.　　　Specification of Letters Patent.　　　Patented Sept. 8, 1908.

Application filed August 17, 1907. Serial No. 389,044.

*To all whom it may concern:*

Be it known that I, JAMES D. O'BRIEN, a citizen of the United States of America, residing at Phœnixville, in the county of Chester and State of Pennsylvania, have invented new and useful Improvements in Thill-Detachers, of which the following is a specification.

This invention relates to improvements in thills by means of which a thill may be detached to release an unruly horse and prevent him from running away with a vehicle, and the said invention consists in the construction, combination and arrangement of devices hereinafter fully described and claimed.

In the accompanying drawing,—Figure 1 is a top plan view of a pair of thills constructed in accordance with this invention and provided with detaching or releasing devices embodying the invention. Fig. 2 is a sectional view of the same. Fig. 3 is a detail top plan view partly in section. Fig. 4 is a detail transverse sectional view taken on the plane indicated by the line *a—a* of Fig. 2. Fig. 5 is a detail elevation of the locking lever and its connections.

The thills comprise each a front section 1 and a rear section 2, the rear sections having the usual downturned portions 3 secured by means of bolts 4 and clips 5 to the front axle 6 of a vehicle. The front sections 1 are connected together at a suitable distance from their rear ends by a cross bar 7 on which the swingletree 8 is mounted, its pivot bolt being indicated at 9. The rear end of each front section 1 of the thills is provided on its inner side with a recess 10, and the said rear end portions of the front sections 1 are parallel with each other and are here shown as rectangular cross sectionally, but may be of any other suitable shape. Each rear section 2 is provided at its front end with a forwardly extending coupling sleeve or box 11, preferably made of metal, fitted on the front end of the rear section and secured thereto as by means of bolts 12. The said coupling sleeves or boxes are provided on their inner sides with openings 13 and are open at their front ends to receive the rear ends of the front thill sections 1. A cross bar 14 connects the sleeve couplings or boxes and hence the rear thill sections together and is here shown as having its ends secured as by means of screws 15 on plates or arms 16 which are bolted to the underside of said coupling sleeves or boxes and extend inwardly therefrom. To the front ends of the rear thill sections are pivotally connected locking links 17 which are provided each on one side with a shoulder 18 adapted to fit in the recess 10 of one of the front thill sections, the corresponding surfaces of such shoulders and such recesses being curved, and cam surfaces 19 being provided at the rear ends of the front thill sections in rear of the recesses 10 which enable the front thill sections to move the locking links inwardly to disengage their shoulders 18 from the recesses 10 by drawing forward on the front thill sections when the locking links have been released by the means and in the manner hereinafter described to hence enable the front thill sections to which the horse is attached to be completely uncoupled and released from the rear thill sections, so that an unruly horse may be released from the vehicle and prevented from running away with the vehicle.

Bolts 20 which operate in guides 21 on the upper side of the cross bar 14 have their outer ends pivotally connected, as at 22, to the locking links 17. A locking wedge 23 bears between the inner ends of the said bolts 20, and when the said wedge is moved forwardly serves to maintain the locking links 17 in locking position with their shoulders 18 engaged with the recesses 10 of the front thill sections, as shown in Fig. 1. When the said locking wedge is drawn rearwardly from between the inner ends of the bolts 20 the latter are released to release the locking links 17 so that the latter are free to move inwardly to release the front thill sections and permit such front thill sections to be uncoupled from the rear thill sections and hence entirely detached from the vehicle. The said locking wedge 23 is pivotally connected, as at 25, to the lower end of a lever 26 which is here shown as mounted, as at 27, on the cross bar 14. The bracket 28 on which the lever 26 is mounted is provided with a segment 29, and said lever has a locking dog 30 of usual construction to engage such segment and hold the said lever in position to normally retain the locking wedge 23 in position to keep the front sections of the thills coupled to the rear sections thereof. It will be understood that by first releasing the dog 30 the lever by a single movement in one direction may be caused to withdraw the locking wedge from between the inner ends of the bolts 20 to release the locking links 13 and hence detach the front sections of the thills.

Having thus described the invention, what is claimed as new, is:—

1. Thills comprising rear sections and front sections detachably connected thereto and coupling sleeves in which the joints between said front and rear sections are disposed, in combination with pivoted locking links engaging such front sections, the latter and such locking links having coacting cam surfaces for the purpose set forth, and longitudinally movable bolts between such pivoted locking links and locking and unlocking means for such bolts.

2. Thills comprising rear sections and front sections detachably coupled thereto, in combination with pivotally mounted locking links carried by the rear sections to engage such front sections, and bolts to operate such links, and a movable wedge-acting element between the inner ends of such bolts, for the purpose set forth.

3. Thills comprising rear sections and front sections detachably coupled thereto, in combination with pivotally mounted locking links carried by the rear sections to engage such front sections, bolts to operate such links and a movable wedge-acting element between the inner ends of such bolts, and means to operate such wedge-acting element.

In testimony whereof, I affix my signature in presence of two witnesses.

JAMES D. O'BRIEN.

Witnesses:
KATIE T. O'BRIEN,
SAML. WILSON.